(12) United States Patent
Tu et al.

(10) Patent No.: US 12,204,967 B2
(45) Date of Patent: Jan. 21, 2025

(54) TWO-DIMENSIONAL CODE GENERATION AND DECODING METHODS, APPARATUSES, AND DEVICES

(71) Applicant: ALIPAY.COM CO., LTD., Shanghai (CN)

(72) Inventors: Yinhai Tu, Shanghai (CN); Le Tao, Shanghai (CN)

(73) Assignee: ALIPAY.COM CO., LTD., Shanghai (CN)

( * ) Notice: Subject to any disclaimer, the term of this patent is extended or adjusted under 35 U.S.C. 154(b) by 0 days.

(21) Appl. No.: 18/551,997

(22) PCT Filed: Mar. 18, 2022

(86) PCT No.: PCT/CN2022/081625
§ 371 (c)(1),
(2) Date: Sep. 22, 2023

(87) PCT Pub. No.: WO2022/199471
PCT Pub. Date: Sep. 29, 2022

(65) Prior Publication Data
US 2024/0185016 A1 Jun. 6, 2024

(30) Foreign Application Priority Data
Mar. 23, 2021 (CN) .................. 202110308114.2

(51) Int. Cl.
*G06K 19/06* (2006.01)
*G06K 7/14* (2006.01)

(52) U.S. Cl.
CPC ..... *G06K 19/06037* (2013.01); *G06K 7/1473* (2013.01); *G06K 19/06075* (2013.01); *G06K 19/06103* (2013.01); *G06K 19/06131* (2013.01)

(58) Field of Classification Search
CPC .......... G06K 19/06037; G06K 7/1473; G06K 7/1417
See application file for complete search history.

(56) References Cited

U.S. PATENT DOCUMENTS

| | | | |
|---|---|---|---|
| 2015/0324946 A1 | 11/2015 | Arce et al. | |
| 2016/0342873 A1* | 11/2016 | Feld | .................. G06K 7/10722 |
| 2020/0097692 A1* | 3/2020 | Tu | .................... G06K 19/06037 |

FOREIGN PATENT DOCUMENTS

| | | |
|---|---|---|
| CN | 104933387 A | 9/2015 |
| CN | 105975894 A | 9/2016 |

(Continued)

OTHER PUBLICATIONS

The International Search Report and Written Opinion of the International Searching Authority for International Application No. PCT/CN2022/081625 mailed on May 31, 2022.

*Primary Examiner* — Sonji N Johnson
(74) *Attorney, Agent, or Firm* — Womble Bond Dickinson (US) LLP (57) ABSTRACT

A method is disclosed that includes: obtaining two-dimensional code of a to-be-generated two-dimensional code image; performing error resilient coding by using a coding algorithm with a predetermined error-tolerant rate, to obtain error-tolerant-processed two-dimensional code; determining a code element shape that is corresponding to each data information bit in the error-tolerant-processed two-dimensional code and that is in a generation region of the two-dimensional code image; determining, according to a predetermined arrangement rule of the two-dimensional code, first position information that is corresponding to each data information bit of the error-tolerant-processed two-dimensional code and that is in the generation region; determining second position information of each positioning point bit in the generation region; and generating the two-dimensional (Continued)

code image based on the first position information, the code element shape corresponding to each data information bit, and the second position information of each positioning point bit.

20 Claims, 5 Drawing Sheets

(56) References Cited

FOREIGN PATENT DOCUMENTS

| | | | |
|---|---|---|---|
| CN | 106951812 | A | 7/2017 |
| CN | 108764420 | A | 11/2018 |
| CN | 108960000 | A | 12/2018 |
| CN | 110288069 | A | 9/2019 |
| CN | 110969233 | A | 4/2020 |
| CN | 111209991 | A | 5/2020 |
| CN | 112926715 | A | 6/2021 |
| CN | 113487001 | A | 10/2021 |

* cited by examiner

TWO-DIMENSIONAL CODE GENERATION AND DECODING METHODS, APPARATUSES, AND DEVICES

This application is a national stage entry of International Application No. PCT/CN2022/081625 filed on Mar. 18, 2022, which claims priority to Chinese Application No. 202110308114.2 filed on Mar. 23, 2021, the contents of which are incorporated herein by reference in their entirety.

TECHNICAL FIELD

This specification relates to the field of Internet technologies, and in particular, to two-dimensional code generation and decoding methods, apparatuses, and devices.

BACKGROUND

In recent years, two-dimensional codes have been widely used, especially in fields such as mobile payment and online social networking. Because of its large information capacity and rapid recognition, it is rapidly popularized in people's daily life. At present, the two-dimensional code has been widely popularized. However, for a conventional two-dimensional code, each two-dimensional code can represent one file, one page, or one application. Because of its openness, it is easy to become a hotbed of Trojan virus. During code scanning, a user abandons code scanning for fear that a mobile phone of the user can be infected with a virus after the code scanning, and a conventional two-dimensional code cannot satisfy a brand advertisement requirement of a mini program.

Based on the previous considerations, a mini program code emerges accordingly. Compared with a common two-dimensional code, the mini program code looks more artistic. In addition, for the mini program code, before scanning the mini program code, the user can clearly know an application of which mini program will be experienced after code scanning.

Therefore, in life, a more reliable mini program code generation solution and decoding solution are also needed.

SUMMARY

Embodiments of this specification provide two-dimensional code generation and decoding methods, apparatuses, and devices, so as to resolve a problem that a recognition rate of an existing two-dimensional code recognition method is low.

To resolve the previous technical problem, an embodiment of this specification is implemented as follows: A two-dimensional code generation method provided in the embodiment of this specification includes: obtaining two-dimensional code of a to-be-generated two-dimensional code image; performing error resilient coding on the two-dimensional code by using a coding algorithm with a predetermined error-tolerant rate, to obtain error-tolerant-processed two-dimensional code; determining a code element shape that is corresponding to each data information bit in the error-tolerant-processed two-dimensional code and that is in a generation region of the two-dimensional code image, where the code element shape includes a dot or an arc; determining, according to a predetermined arrangement rule of the two-dimensional code, first position information that is corresponding to each data information bit of the error-tolerant-processed two-dimensional code and that is in the generation region; determining second position information of each positioning point bit in the generation region; and generating the two-dimensional code image based on the first position information, the code element shape corresponding to each data information bit, and the second position information of each positioning point bit.

An embodiment of this specification provides a two-dimensional code decoding method, including: obtaining image information of a to-be-recognized two-dimensional code image; determining positioning point position information, in the image, of each positioning point bit in the to-be-recognized two-dimensional code image according to the image information of the to-be-recognized two-dimensional code image; determining position information of each data information bit in the image based on the positioning point position information; determining a code element shape corresponding to each data information bit based on the position information of the data information bit in the image, where the code element shape includes a dot or an arc; generating two-dimensional code according to a predetermined arrangement rule and the code element shape corresponding to each data information bit; and decoding the two-dimensional code by using a predetermined decoding algorithm, to obtain content information stored in the data information bit.

An embodiment of this specification provides a two-dimensional code generation apparatus, including: a two-dimensional code acquisition module, configured to obtain two-dimensional code of a to-be-generated two-dimensional code image; an error resilient coding module, configured to perform error resilient coding on the two-dimensional code by using a coding algorithm with a predetermined error-tolerant rate, to obtain error-tolerant-processed two-dimensional code; a code element shape determining module, configured to determine a code element shape that is corresponding to each data information bit in the error-tolerant-processed two-dimensional code and that is in a generation region of the two-dimensional code image, where the code element shape includes a dot or an arc; a first position information determining module, configured to determine, according to a predetermined arrangement rule of the two-dimensional code, first position information that is corresponding to each data information bit of the error-tolerant-processed two-dimensional code and that is in the generation region; a second position information determining module, configured to determine second position information of each positioning point bit in the generation region; and a two-dimensional code image generation module, configured to generate the two-dimensional code image based on the first position information, the code element shape corresponding to each data information bit, and the second position information of each positioning point bit.

An embodiment of this specification provides a two-dimensional code decoding apparatus, including: an image information acquisition module, configured to obtain image information of a to-be-recognized two-dimensional code image; a positioning point position information determining module, configured to determine positioning point position information, in the image, of each positioning point bit in the to-be-recognized two-dimensional code image according to the image information of the to-be-recognized two-dimensional code image; a data information bit position information determining module, configured to determine position information of each data information bit in the image based on the positioning point position information; a code element shape determining module, configured to determine a code element shape corresponding to each data information bit based on the position information of the data information bit in the image, where the code element shape includes a dot or an arc; a two-dimensional code generation module, configured to: generate two-dimensional code according to a predetermined arrangement rule and the code element shape corresponding to each data information bit; and a decoding module, configured to decode the two-dimensional code by using a predetermined decoding algorithm, to obtain content information stored in the data information bit.

An embodiment of this specification provides a two-dimensional code generation device, including at least one processor; and a memory communicatively connected to the at least one processor, where the memory stores instructions executable by the at least one processor, and the instructions are executed by the at least one processor, so the at least one processor can: obtain two-dimensional code of a to-be-generated two-dimensional code image; perform error resilient coding on the two-dimensional code by using a coding algorithm with a predetermined error-tolerant rate, to obtain error-tolerant-processed two-dimensional code; determine a code element shape that is corresponding to each data information bit in the error-tolerant-processed two-dimensional code and that is in a generation region of the two-dimensional code image, where the code element shape includes a dot or an arc; determine, according to a predetermined arrangement rule of the two-dimensional code, first position information that is corresponding to each data information bit of the error-tolerant-processed two-dimensional code and that is in the generation region; determine second position information of each positioning point bit in the generation region; and generate the two-dimensional code image based on the first position information, the code element shape corresponding to each data information bit, and the second position information of each positioning point bit.

An embodiment of this specification provides a two-dimensional code decoding device, including at least one processor; and a memory communicatively connected to the at least one processor, where the memory stores instructions executable by the at least one processor, and the instructions are executed by the at least one processor, so the at least one processor can: obtain image information of a to-be-recognized two-dimensional code image; determine positioning point position information, in the image, of each positioning point bit in the to-be-recognized two-dimensional code image according to the image information of the to-be-recognized two-dimensional code image; determine position information of each data information bit in the image based on the positioning point position information; determine a code element shape corresponding to each data information bit based on the position information of the data information bit in the image, where the code element shape includes a dot or an arc; generate two-dimensional code according to a predetermined arrangement rule and the code element shape corresponding to each data information bit; and decode the two-dimensional code by using a predetermined decoding algorithm, to obtain content information stored in the data information bit.

Some embodiments of this specification provide a computer readable medium that stores computer readable instructions, and the computer readable instructions can be executed by a processor to implement a two-dimensional code generation and decoding method.

In an embodiment of this specification, the following beneficial effects can be achieved by: obtaining two-dimensional code of a to-be-generated two-dimensional code image; performing error resilient coding by using a coding algorithm with a predetermined error-tolerant rate, to obtain error-tolerant-processed two-dimensional code; determining a code element shape that is corresponding to each data information bit in the error-tolerant-processed two-dimensional code and that is in a generation region of the two-dimensional code image; determining, according to a predetermined arrangement rule of the two-dimensional code, first position information that is corresponding to each data information bit of the error-tolerant-processed two-dimensional code and that is in the generation region; determining second position information of each positioning point bit in the generation region; and generating the two-dimensional code image based on the first position information, the code element shape corresponding to each data information bit, and the second position information of each positioning point bit. In this solution, a generated mini program code is in a ring shape as a whole, and a data region is a ring formed by a dot and an arc. In addition, a blank region with a same interval is left in the middle between adjacent rings, the intermediate region and a lower right corner region are used as a logo display region, data are evenly distributed, and data of each part are in consistent error tolerance. Two-dimensional codes with strong anti-distortion and anti-stain capabilities can be generated.

BRIEF DESCRIPTION OF DRAWINGS

To describe technical solutions in the embodiments of this specification or in the existing technology more clearly, the following briefly describes the accompanying drawings required for describing the embodiments or the existing technology. Clearly, the accompanying drawings in the following description merely show some embodiments of this specification, and a person of ordinary skill in the art can still derive other drawings from these accompanying drawings without creative efforts.

DESCRIPTION OF EMBODIMENTS

To make the objectives, technical solutions, and advantages of one or more embodiments of this specification clearer, the following clearly and comprehensively describes the technical solutions of one or more embodiments of this specification with reference to corresponding accompanying drawings and one or more specific embodiments of this specification. Clearly, the described embodiments are merely some but not all of the embodiments of this specification. All other embodiments obtained by a person of ordinary skill in the art based on the embodiments of this specification without creative efforts shall fall within the protection scope of one or more embodiments of this specification.

A two-dimensional code is also referred to as a two-dimensional barcode. A common two-dimensional code is a QR code, and QR is short for quick response. It is an ultra-popular coding method on a mobile device in recent years. The QR code can store more information and indicate more data types than a conventional barcode.

In an actual application, compared with a two-dimensional code, a mini program code is attached to an application program. For example, mini program codes of some chat APPs can be generated and recognized only by using the chat APPs, and security is higher, and each mini program code has a fixed mini program logo in a lower right corner thereof, so more brand information can be transparently transmitted.

Currently, application of mini program codes is becoming more and more widespread, especially in the fields such as mobile payment and online social networking. However, in many scenarios, existing mini program codes still have a limitation. For example, a capability of resisting image distortion of the mini program code is insufficient, and the mini program code is printed on a flat plane. If a convex or concave occurs on the plane in which the mini program code is located, for example, a two-dimensional code is printed on a sphere, a recognition rate of the two-dimensional code is greatly reduced. For a surface of a cylinder, a surface of a cone, or even a surface of a non-rigid body such as a fabric, a recognition capability of the two-dimensional code is very limited. In addition, in the existing mini program code, a small stain at any position can cause that the mini program code cannot be recognized.

The technical solutions provided in the embodiments of this specification are described in detail below with reference to the accompanying drawings.

Next, a two-dimensional code generation method provided in the embodiments of this specification is specifically described with reference to the accompanying drawings.

Embodiment 1

Figure 1:
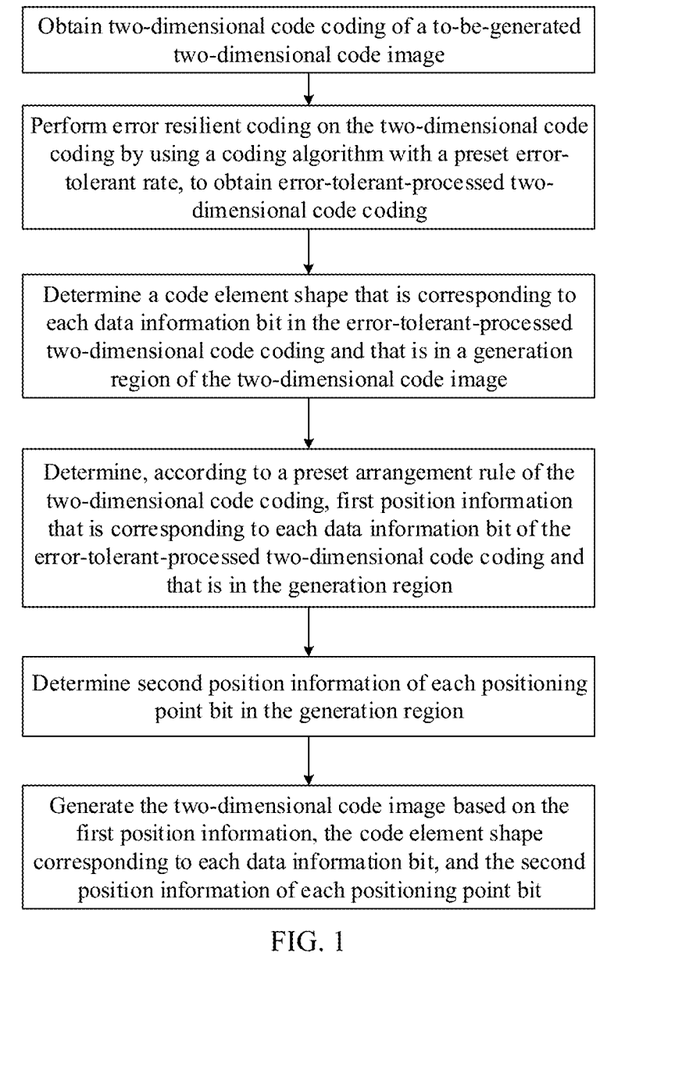
FIG. 1 is a schematic flowchart illustrating a two-dimensional code generation method, according to an embodiment of this specification.

FIG. 1 is a schematic flowchart illustrating a two-dimensional code generation method, according to an embodiment of this specification. From a program perspective, the process can be executed by a program or an application client that is loaded on an application server.

As shown in FIG. 1, the process can include the following steps: Step 110: Obtain two-dimensional code of a to-be-generated two-dimensional code image.

The two-dimensional code can represent a code used to generate a two-dimensional code image, for example, can be a character string with predetermined bits, such as a binary sequence or a ternary sequence. In this solution, a binary sequence is used as an example. After information conversion is performed on content data carried in a two-dimensional code, a two-dimensional code sequence can be obtained.

It is worthwhile to note that the two-dimensional code here can refer to a mini program code, and the mini program code can indicate a two-dimensional code attached to an original application program and used for a function, for example, a mini program code in an instant messaging application program and a mini program code in a payment application program. In an actual application scenario, the mini program code can be used in many scenarios such as meal ordering, payment, ticket purchasing, and medical registration.

In the description of this specification, the two-dimensional code can refer to two-dimensional code or a two-dimensional code picture, and can be set according to an actual requirement. This is not specifically limited in this specification. In addition, in the embodiment of this specification, two-dimensional code information refers to information that is carried in the two-dimensional code and that has an actual meaning, for example, user center identification information.

Step 120: Perform error resilient coding on the two-dimensional code by using a coding algorithm with a predetermined error-tolerant rate, to obtain error-tolerant-processed two-dimensional code.

Error resilient coding can indicate that a part of redundancy information is added to a coding process to enhance a code error resistance capability, to strive to use a minimum quantity of redundancy information to obtain a maximum gain, and code error resistance performance thereof is at a cost of coding efficiency.

According to different types and manners of processing error diffusion, error resilient coding technologies mainly include: insertion of synchronization marks (RM), data partitioning (DP), reversible variable length coding (RVLC), parameter set, intra-frame coding update technology, layered coding (LC) technology, multi-description coding (MDC) related to sub-data stream transmission, etc.

An error-tolerant rate of the two-dimensional code can mean that the generated two-dimensional code can be scanned successfully by a user even if a part of the two-dimensional code is shielded or a part thereof is not completely displayed. A ratio of this shielded part to the whole can be understood as an error-tolerant rate.

Error resilient coding has multiple error tolerance levels, and can be understood as that error resilient coding has multiple levels of redundancy. For example, error resilient coding of each version corresponds to four error tolerance levels: L, M, Q, and H. For an L-level error-tolerant mini program code, about 10% of word codes can be corrected; for an M-level error-tolerant code, about 15% of word codes can be corrected; for a Q-level error-tolerant code, about 25% of word codes can be corrected; and for an H-level error-tolerant code, about 35% of word codes can be corrected. For example, for an H-level error-tolerant mini program code, about 35% of word codes can be corrected. This means that, ideally, when 35% of an area of the mini program code is shielded/damaged, a code scanning engine can still recognize information carried by the mini program code.

However, it is worthwhile to note that, the previous H level of 35% is used as an example, the 35% damaged area cannot be a positioning pattern or functional data and must be a pure coding region, and an incorrect region needs to be evenly distributed for recognizing an entire two-dimensional code.

In this solution, the error-tolerant rate is predetermined. Once a version and an error correction level of a mini program code are determined, an error correction code corresponding to the mini program code can be fixed. In a whole process, no additional error tolerance information needs to be added, so as to ensure that data corresponding to a coding region are uniform. Therefore, whatever part of the mini program code is shielded, the mini program code can still be recognized provided that a positioning point bit is not shielded and the shielded area is less than or equal to 35%.

In addition, in a decoding phase, the error correction code can also be eliminated by using a corresponding rule, to obtain corresponding content information.

In this solution, error tolerance is performed by using a coding algorithm with a fixed error-tolerant rate, so generated mini program code data are evenly distributed, and error tolerance of data at each part is consistent. An error-tolerant capability of a mini program code can be ensured by using error resilient coding with fixed error tolerance, so a generated mini program code has a capability of anti-stain, anti-distortion, and anti-reflection.

Step 130: Determine a code element shape that is corresponding to each data information bit in the error-tolerant-processed two-dimensional code and that is in a generation region of the two-dimensional code image, where the code element shape includes a dot or an arc.

The generation region can represent a region used to generate a two-dimensional code.

The data information bit can represent a point bit in the mini program code and used to indicate carried content information. Specifically, the data information bit can store product information or other content information. A scanning device can obtain content information stored in the data information bit by scanning the mini program code.

The generation region of the two-dimensional code can refer to a contour region of the two-dimensional code. For example, when a two-dimensional code with a diameter of 6 centimeters needs to be generated, a contour region of the two-dimensional code is a circular region with a diameter of 6 centimeters.

The code element shape can refer to a shape of a code block used to carry content information in a two-dimensional code image, for example, a dot, a square, a rectangle, and an arc. In the embodiment of this specification, the code element shape can include a dot and an arc.

In two-dimensional code, a value of each code bit corresponds to a code element shape in a mini program code. For example, if two-dimensional code is a binary sequence, "1" in the binary sequence represents a code element shape of a black dot, and "0" in the binary sequence represents a white dot (in this case, a default background color is white). If "1" is continuously displayed in the binary sequence, a black arc is formed.

Step 140: Determine, according to a predetermined arrangement rule of the two-dimensional code, first position information that is corresponding to each data information bit of the error-tolerant-processed two-dimensional code and that is in the generation region.

The first position information can indicate a position corresponding to each data information bit in the generation region.

The predetermined arrangement rule can represent a predetermined sorting rule for two-dimensional code. For example, a start code element point bit in a two-dimensional code image corresponding to the two-dimensional code can be set in the predetermined arrangement rule, or a code element point bit in the two-dimensional code image and corresponding to each code bit in the two-dimensional code can be set. Therefore, based on the two-dimensional code, the position of each data bit in the generation region can be specifically determined according to the predetermined arrangement rule.

Step 150: Determine second position information of each positioning point bit in the generation region.

The second position information can indicate a position corresponding to each positioning point bit in the generation region.

The positioning point bit can represent a point bit for positioning a two-dimensional code. Generally, there are four positioning point bits, including a directional positioning point bit, and the directional positioning point bit can mark a direction of the two-dimensional code. The directional positioning point bit can be disposed in a lower right corner of the two-dimensional code image, and other positioning point bits can be respectively disposed in an upper left corner position, a lower left corner position, and an upper right corner position in the generation region of the two-dimensional code image.

A circular two-dimensional code is used as an example. After a direction of the circular two-dimensional code is determined by using a directional positioning point bit in a lower right corner, positions of the other three positioning point bits of the circular two-dimensional code can be further determined, so as to determine position information of each positioning point bit.

Step 160: Generate the two-dimensional code image based on the first position information, the code element shape corresponding to each data information bit, and the second position information of each positioning point bit.

It is worthwhile to note that the position information of each positioning point bit and position information of a valid information bit can be represented by using coordinates, or can be represented in a matrix form. When being represented in a matrix form, each positioning point bit and effective information bit in the two-dimensional code can be correspondingly converted into corresponding elements in each row and each column in a matrix. For example, a positioning point bit of an upper left positioning region in the two-dimensional code is converted into an element corresponding to the first row and the first column in the matrix.

A two-dimensional code image can include a positioning point bit used to position a two-dimensional code and a data information bit used to carry content information. A code element shape of each positioning point bit is known. Therefore, a corresponding two-dimensional code image can be generated after position information of each positioning point bit, position information of each data information bit, and a code element shape of each data information bit are determined.

It should be understood that, in the method described in one or more embodiments of this specification, sequences of some steps in the method can be exchanged with each other based on an actual requirement, or some steps in the method can be omitted or deleted.

The method in FIG. 1 includes: obtaining two-dimensional code of a to-be-generated two-dimensional code image; performing error resilient coding by using a coding algorithm with a predetermined error-tolerant rate, to obtain error-tolerant-processed two-dimensional code; determining a code element shape that is corresponding to each data information bit in the error-tolerant-processed two-dimensional code and that is in a generation region of the two-dimensional code image; determining, according to a predetermined arrangement rule of the two-dimensional code, first position information that is corresponding to each data information bit of the error-tolerant-processed two-dimensional code and that is in the generation region; determining second position information of each positioning point bit in the generation region; and generating the two-dimensional code image based on the first position information, the code element shape corresponding to each data information bit, and the second position information of each positioning point bit. In this solution, shape designs of a dot and an arc and coding by using a fixed error resilient coding algorithm can generate a two-dimensional code with a strong anti-distortion capability and a strong anti-stain capability.

Based on the method in FIG. 1, an embodiment of this specification further provides some specific implementations of the method, which are described below.

Optionally, the determining a code element shape that is corresponding to each data information bit in the error-tolerant-processed two-dimensional code and that is in a generation region of the two-dimensional code image can specifically include: determining, for each code bit in the error-tolerant-processed two-dimensional code, a sequence of the code bit in the error-tolerant-processed two-dimensional code; determining a position of a data information bit corresponding to the sequence in the two-dimensional code generation region; and determining a code element shape corresponding to a data information bit of the position according to a value of the code bit.

It is worthwhile to note that error resilient coding is performed by using a coding algorithm with a predetermined error-tolerant rate. It can be understood that a coding algorithm with a fixed error-tolerant rate is used to convert data corresponding to content information into a character string with predetermined bits. For example, the coding algorithm with a fixed error-tolerant rate is used to convert data corresponding to content information into a binary sequence. The content information can represent information that needs to be carried in a two-dimensional code, for example, product information, application function information, platform information, and brand information. When the content information is converted into a binary sequence, every three bits of characters corresponding to the content information can be grouped into one group, each group of data is converted into 10-bit binary data, and the remaining one or two bits are converted into 4-bit or 7-bit binary data.

It is worthwhile to note that each binary bit in a binary sequence has a sequence in the binary sequence. For example, a binary sequence is 010110101. From left to right, the first binary bit in the binary sequence is 0, the second binary bit is 1, the third binary bit is 0, . . . , and the ninth binary bit is 1. The first binary bit in the binary sequence is corresponding to a predetermined start point bit in the data information bits in the two-dimensional code, the second binary bit in the binary sequence is corresponding to the second point bit in the data information bits in the two-dimensional code, and by analogy, . . . , the binary bits in the binary sequence are respectively corresponding to corresponding positions in the data information bits in the two-dimensional code.

Assume that "1" in binary represents a black dot. In this case, a quantity of dots corresponding to an arc can be set. For example, at least three black dots can be set to correspond to one segment of arc, that is, one segment of arc is formed only when there are three consecutive "1" in the binary sequence.

Further, a distance between adjacent dots and a distance between a dot and an adjacent arc can be further set. Arrangement angles of a dot and an arc can be further disposed, and the arrangement angle here can refer to an angle value corresponding to polar angle coordinates.

Optionally, the generation region further includes mask information; and before the obtaining two-dimensional code of a to-be-generated two-dimensional code image, the method further includes: performing mask processing on the two-dimensional code according to the mask information, to obtain a mask-processed two-dimensional code.

The mask information can be stored in a point bit other than a positioning point bit. Specifically, how many code elements are required to store the mask information can be determined according to a capacity or a size of a generated two-dimensional code. Generally, one code element can store two types of masks.

It is worthwhile to note that, a region in which the data information bit is located can be a digital region, and a region in which the positioning point bit is located can be a functional region. Mask processing only masks the digital region in which the data information bit is located, and does not affect the functional region in which the positioning point bit is located.

Therefore, a function of the mask can be to enable dots and arcs in the two-dimensional code to be evenly distributed, thereby improving recognition accuracy of the two-dimensional code. Quality of the mask is determined by a mask code. The mask code can be a policy of changing a value of a code element in a two-dimensional code region according to a specific rule. A purpose of using the mask code is to adjust display of each code element in the two-dimensional code. If a code element in the two-dimensional code is processed by the mask, it can be understood that if the code element is a white dot before mask processing is performed, the code element can become a black dot after mask processing. In other words, the mask code can be understood as modifying a pixel value of a code element in the two-dimensional code.

It is worthwhile to note that in this embodiment of this specification, error resilient coding is performed by using a coding algorithm with a predetermined error-tolerant rate, which can ensure that data in a generated mini program code are evenly distributed. The data here can include data corresponding to content that needs to be carried and metadata of code basic information.

The mask is used to ensure that a shape or a color of a code element in the generated mini program code is evenly distributed.

The generated mini program code in the previous embodiment can be described with reference to FIG. 2.

Figure 2:
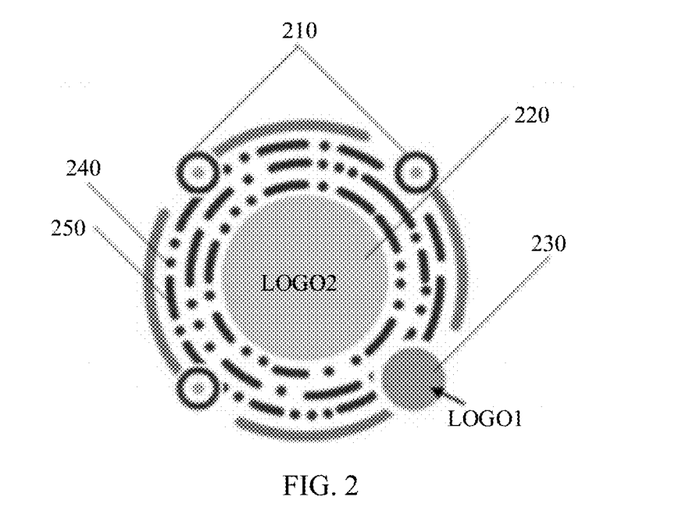
FIG. 2 is a schematic structural diagram illustrating a mini program code, according to an embodiment of this specification.

FIG. 2 is a schematic structural diagram illustrating a mini program code, according to an embodiment of this specification. As shown in FIG. 2, the whole of a mini program image is in a ring shape, and the mini program image can include a ring formed by a dot 240 and an arc 250, an intermediate region 220, a first positioning point bit 210, and a directional positioning point bit 230.

Optionally, a ring width of each circle of ring is the same. The ring width of the ring can be understood as a width of the arc 250, or can be understood as a diameter length of the dot 240. In the mini program code image, the diameter length of each dot 240 is equal to the width of the arc 250.

Optionally, the intermediate region 220 is concentric with the ring. The intermediate region 220 is used to display a first identifier, and the first identifier can be a logo of a brand; adjacent rings have a same interval; and an interval between the intermediate region 220 and a ring formed by adjacent code element shapes is the same as an interval between adjacent rings. As shown in FIG. 2, a background color is white by default, and there is a blank interval between adjacent rings. In such a structure, even when a mini program code is printed and pasted on a column or a printed paper naturally curls, with a design of "one circle in black and one circle in white", even if a part of image is compressed when pasted, it can be determined that a next circle of a black ring formed by a dot 240 and an arc 250 is white, and there must be one circle of white in the middle between two circles of black rings, so the compressed part can be determined. Therefore, a recognition capability of the generated mini program code in a non-linear distortion scenario is improved.

It is worthwhile to note that a background color of the two-dimensional code image and a color of an identification region in the two-dimensional code can be set according to an actual application scenario. In addition, the two colors in the previous step can represent two colors after binarization, not two colors in a color sense. An initially generated two-dimensional code has multiple colors, and only two colors are obtained after binarization processing.

As shown in FIG. 2, the data region can be three circles of rings formed by dots 240 or arcs 250, and is used to carry data. Error resilient coding is performed by using an error-tolerant algorithm with specified error tolerance efficiency. For example, error resilient coding whose overall error-tolerant rate reaches 25% is used. A specific error-tolerant policy is (16, 8), that is, 16 bytes of valid data support a maximum of 8 bytes of error correction, and a total length of a data stream is 32 bytes. The directional positioning point bit 230 in the lower right corner can be used as an auxiliary positioning point to participate in code positioning and decoding, and is further used to display a second identifier. Further, a display area of the second identifier in the lower right corner can be less than a display area of the first identifier in the intermediate region, and content in the two logo regions can be filled with customized content as required, such as a brand or an activity logo.

Optionally, an exclusive OR operation is performed on the mini program code and 32 masks (also referred to as "mask", which can be generated according to a specific rule), and finally, a mini program code that satisfies a condition is selected as a final mini program code.

It is worthwhile to note that in FIG. 2, the data region can be optionally three or four circles, and the outermost circle (the fourth circle) can be used to carry data, or can be used as an ornament of the mini program code image.

By using the previous method, the generated mini program code is in a ring shape in the whole, and the data region is a ring formed by a dot and an arc. In addition, a blank region with a same interval is left in the middle between adjacent rings. The intermediate region and the lower right corner region are used as a logo display region, and are coded by using fixed error tolerance. Therefore, error tolerance information does not need to be transparently transmitted, so data are evenly distributed. It can be ensured that the generated two-dimensional code has a strong anti-distortion capability and a strong anti-stain capability, and transparently transmits more brand information.

Corresponding to the previous embodiment, the generated two-dimensional code corresponds to a decoding method.

Embodiment 2

Figure 3:
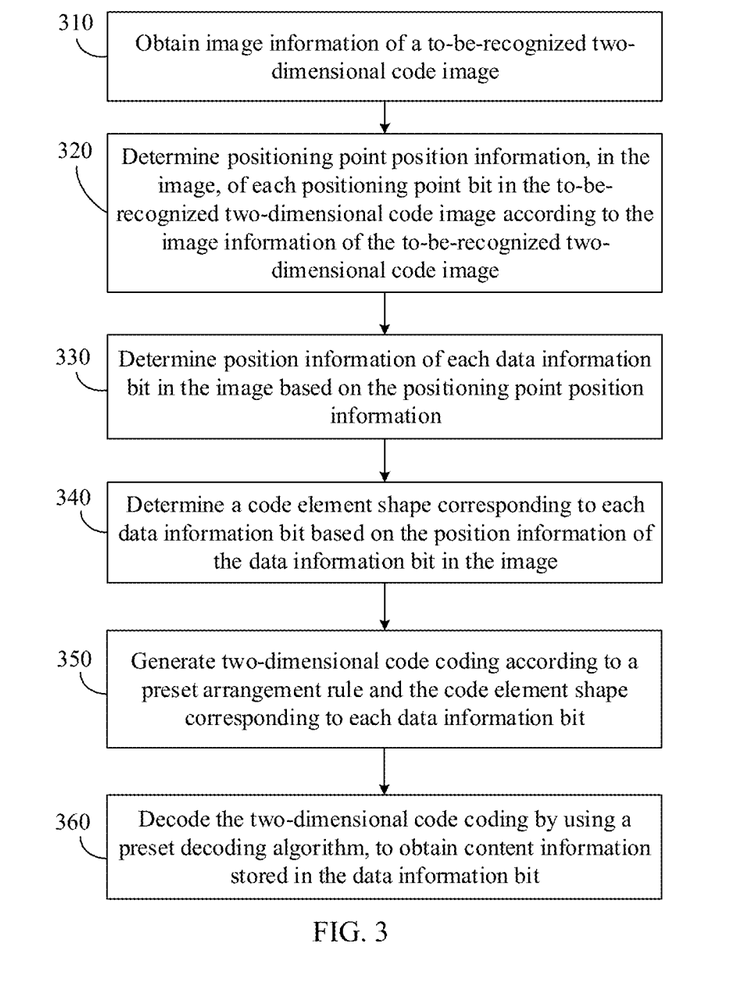
FIG. 3 is a schematic flowchart illustrating a two-dimensional code decoding method, according to an embodiment of this specification.

FIG. 3 is a schematic flowchart illustrating a two-dimensional code decoding method, according to an embodiment of this specification. From a program perspective, the process can be executed by a program or an application client that is loaded on an application server. A decoding process in Embodiment 2 corresponds to the coding process in Embodiment 1.

As shown in FIG. 3, the process can include the following steps: Step 310: Obtain image information of a to-be-recognized two-dimensional code image.

It is worthwhile to note that the image information mentioned in this step can represent information of a two-dimensional code itself that is not limited to a two-dimensional code carrier, for example, information of a two-dimensional code drawn on a computer, for example, size information of the two-dimensional code, position information of each positioning point bit, position information of a data information bit, a code element shape and a code element color corresponding to each point bit in the two-dimensional code.

Step 320: Determine positioning point position information, in the image, of each positioning point bit in the to-be-recognized two-dimensional code image according to the image information of the to-be-recognized two-dimensional code image.

Step 330: Determine position information of each data information bit in the image based on the positioning point position information.

Because the position information of each positioning point bit can be determined from the image information of the two-dimensional code, and a logo display region reserved in the middle is known, except the positioning point bit and the middle display region, a remaining point bit can be determined as the data information bit.

The data information bit can store content information. A scanning device can obtain the content information stored in the data information bit by scanning the two-dimensional code.

Step 340: Determine a code element shape corresponding to each data information bit based on the position information of the data information bit in the image, where the code element shape includes a dot or an arc.

After the position information of the data information bit in the image is determined, the code element shape corresponding to each data information bit can be determined from the image information.

Step 350: Generate two-dimensional code according to a predetermined arrangement rule and the code element shape corresponding to each data information bit.

The predetermined arrangement rule can be an arrangement rule used when a mini program code is generated. During decoding, corresponding parsing needs to be performed according to the arrangement rule used when the mini program two-dimensional code is generated, and a code element shape of each data information bit can be parsed into two-dimensional code.

Step 360: Decode the two-dimensional code by using a predetermined decoding algorithm, to obtain content information stored in the data information bit.

The coding algorithm in Embodiment 1 should correspond to the decoding algorithm in Embodiment 2. Assume that an error-tolerant algorithm with 25% error tolerance is used to code the content information to obtain a binary sequence. Then, during decoding, an error-tolerant algorithm with 25% error tolerance is also used to decode the binary sequence. It is worthwhile to note that a specific selection of the error tolerance algorithm can be selected according to an actual application scenario.

Based on the method in FIG. 3, an embodiment of this specification further provides some specific implementations of the method, which are described below.

Optionally, the to-be-recognized two-dimensional code image can be in a ring shape; the image includes first positioning point bits and directional positioning point bits; the first positioning point bits are distributed in an upper left corner position, an upper right corner position, and a lower left corner position of the image; and the directional positioning point bits are distributed in a lower right corner of the image.

Specifically, for a mini program code structure in the to-be-recognized two-dimensional code image, references can be made to the description of the mini program code structure in Embodiment 1.

Optionally, the determining positioning point position information, in the image, of each positioning point bit in the to-be-recognized two-dimensional code image according to the image information of the to-be-recognized two-dimensional code image can specifically include: determining position information, in the image, of each positioning point bit in the to-be-recognized two-dimensional code image and the position information of each data information in the image by using an adaptive sampling algorithm based on the positioning point position information.

In this solution, during decoding, a position of a sampling point is determined by using an adaptive sampling algorithm, and finally a bit stream is obtained through sampling, thereby further increasing a recognition rate of a non-linear distortion scenario.

Distortion is a common non-linear transformation, for example, a change due to a surface wrinkle of a material, and a material is laid on an uneven surface, for example, a surface of a cylinder, so a code changes. In an existing sampling algorithm, when sampling is performed, a corresponding process is as follows: Four positioning point bits are found in an incoming frame image, and a transformation matrix from a code-based coordinate system to an image-based coordinate system is calculated according to four positioning point bits (prefabricated) in the code-based coordinate system and the four positioning point bits in the image-based coordinate system. Then, based on the transformation matrix and a data point bit (prefabricated) of the code-based coordinate system, a sampling position of the image-based coordinate system is calculated, a 0/1 bit stream is directly obtained through sampling at a corresponding point bit, and finally, the bit stream is decoded to obtain original data. In an existing sampling method, the first point collected based on a sampling position is directly used as a final sampling point for sampling. In this case, in a non-linear distortion scenario, an image of a mini program code is easily compressed and a part of the image is compressed or stretched, which causes a change in shapes of some code elements in the mini program code image, and an incorrect sampling point is easily collected as a final sampling point to an incorrect bit stream. For example, for an original arc, but after being compressed, a dot is collected, resulting in an error of final recognition of the mini program code.

Based on this defect, in this embodiment of this specification, on the basis of improving the mini program code, a sampling method in the decoding method of the mini program code is further improved, and an error is corrected based on adaptive sampling, so a correct sampling point bit is obtained, and a bit stream with relatively high accuracy is sampled, thereby improving recognition accuracy of the mini program code.

Specifically, the determining the position information of each data information in the image by using an adaptive sampling algorithm based on the positioning point position information can specifically include: determining first position information, in an image coordinate system, of each positioning point bit in the to-be-recognized two-dimensional code image based on the positioning point position information; obtaining second position information of each positioning point bit in a code-based coordinate system; calculating a transformation matrix between the code-based coordinate system and the image coordinate system based on the first position information and the second position information; obtaining third position information of each data information bit in the code-based coordinate system; determining an initial sampling point bit of each data information bit in the image coordinate system based on the transformation matrix and the third position information; modifying the initial sampling point bit based on the adaptive sampling algorithm, to determine a final sampling point bit of each data information bit in the image coordinate system; and performing sampling on the to-be-recognized image based on the final sampling point bit to obtain the position information of each data information bit in the image.

It is worthwhile to note that the code-based coordinate system can be referred to as a standard coordinate system, and can represent a coordinate system that uses a perspective of a code as a reference, without considering any change. An upper left corner of an outer square of the code is an origin, and a single data point is a coordinate system of one unit. The image-based coordinate system can represent a coordinate system that uses a perspective of an incoming frame image as a reference, an upper left corner of the image is a coordinate system of an origin, and each pixel is one unit.

Based on the previous structure of the mini program code, a blank space can be determined between arcs, between the arc and the outermost circle of ornament, and between the arc and the inner LOGO2 region in the mini program code.

An error generated due to distortion has the following two characteristics: Distortion is accumulated gradually, and a specific sampling point is accurate. Then, an accurate sampling position is slowly offset, an error of the distortion is transitive, and an error of one sampling point is similar to that of a sampling point around the sampling point.

In a specific implementation process, an ideal sampling point is always at a center position of a data point. For example, for a black dot, a sampling point should be at a center position of the black dot. For an arc, a sampling point should be positioned in a position at half the width of the arc and away from both sides by at least half a unit or more.

Figure 4:
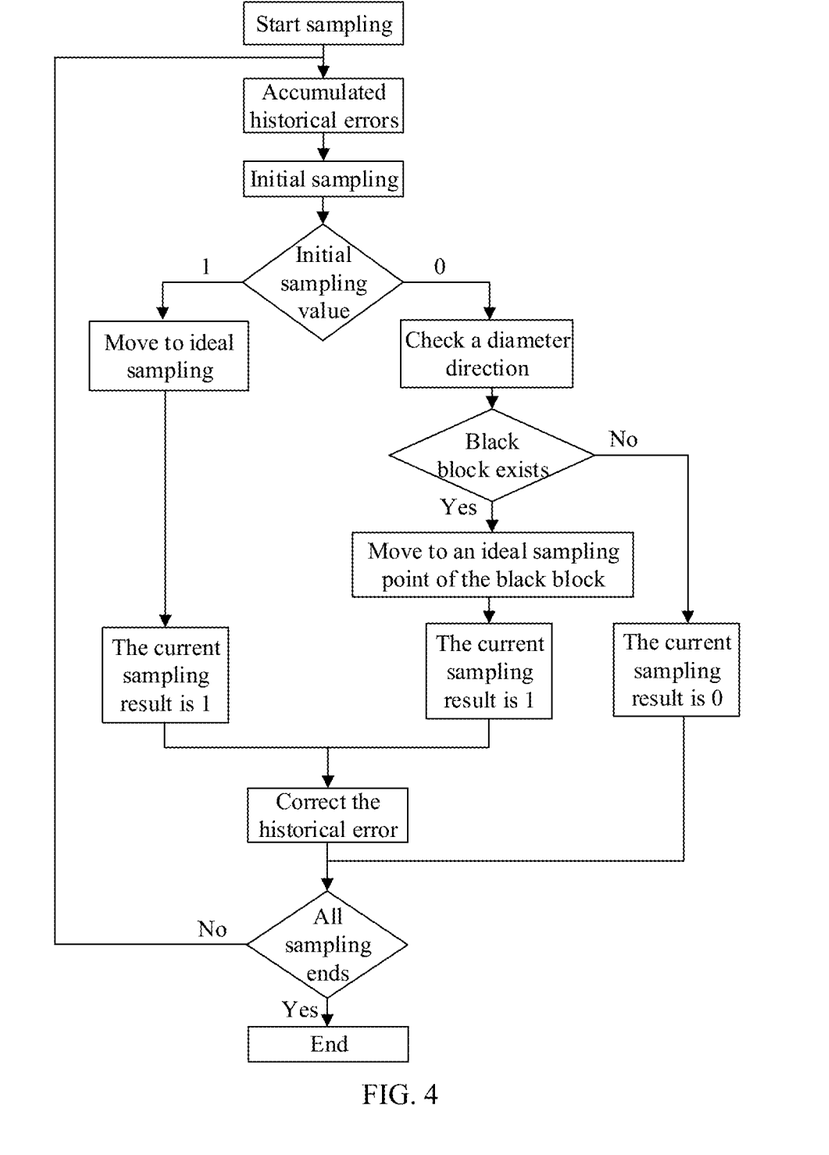
FIG. 4 is a schematic flowchart illustrating adaptive sampling in a two-dimensional code decoding method, according to an embodiment of this specification.

In this embodiment of this specification, based on the previous sampling idea, when each data point is collected, references can be made to FIG. 4 for description.

FIG. 4 is a schematic flowchart illustrating adaptive sampling in a two-dimensional code decoding method, according to an embodiment of this specification.

As shown in FIG. 4, when sampling is performed by using an adaptive sampling method, a historical error can be first superposed after sampling is started. Then, initial sampling is performed according to a conventional sampling method, and initial sampling is performed to obtain an initial sampling result. The initial sampling result can include a black sampling result 1 or a white sampling result 0.

When an initial sampling value is 1, a sampling point can be corrected to a center of a black dot or to a position at half the width of the small arc and away from the edge by half a unit.

When the initial sampling value is 0, a predetermined distance is searched for on both sides in a diameter direction. The predetermined distance can be adjusted based on an actual application scenario. If a black block is found after moving by the predetermined distance, it can indicate that a sampling result here is black, and an original white sampling point being unknown is corrected to an ideal sampling position corresponding to a black sampling point, for example, moved to a center corresponding to the black sampling point.

Error correction is performed based on the historical error, and re-sampling is performed based on a new sampling point after correction. Error correction can indicate that the initial sampling result is corrected. For example, when the initial sampling result is a black dot, the sampling point can be corrected to a center of the black dot or to a position at half the width of the small arc and away from the edge by half a unit.

If the initial sampling result is white, a predetermined distance can be searched for on both sides in a diameter direction. The predetermined distance can be adjusted based on an actual application scenario. If a black block is found after moving by the predetermined distance, it indicates that sampling here should be black, and an original white sampling point is corrected to an ideal sampling position of a black sampling point. If it is still a white block after moving by the set distance, it can be determined that the position of the initial sampling point does not need to be corrected, and all sampling ends.

Based on the previous process, a final sampling point bit is obtained, sampling is performed based on the final sampling point bit to obtain a bit stream, and corresponding content information is finally obtained through decoding.

By using the previous method, decoding is performed by using an adaptive sampling method based on a ring-shaped mini program code, which can improve recognition accuracy of the mini program code.

In the previous embodiment of this specification, compared with an existing dotted two-dimensional code or another circular two-dimensional code, the following technical effects can be implemented: For a mini program code in a dotted instant messaging program, a recognition rate is extremely low in a distortion scenario, especially in a curved scenario, due to outward radiation distribution of the mini program code. However, for a mini program code of a partial circular structure, because data distribution is not uniform, and an error tolerance capability is extremely low, the mini program code cannot be recognized when randomly shielded at any part.

In the solution in this embodiment of this specification, a generated mini program code is in a ring shape in a whole, and a data region is a ring formed by a dot and an arc. In addition, a blank region with a same interval is left in the middle between adjacent rings, the intermediate region and a lower right corner region are used as a logo display region, data are evenly distributed, and data of each part are in consistent error tolerance. For example, error resilient coding with 25% error tolerance ensures an error-tolerant capability of a code. It can be ensured that the generated two-dimensional code has a strong anti-distortion capability and a strong anti-stain capability, and transparently transmits more brand information.

In addition, in some mini program codes, code elements of three colors, that is, dark, high-bright, and medium-bright, are used to carry data. In a complex offline environment (for example, dark and light reflective scenarios), recognition success rates of the mini program codes are greatly reduced. In this solution, data presentation of a binary image has a higher recognition rate in a weak/strong light scenario. In addition, the intermediate region of the mini program code and the directional positioning point region in the lower right corner are set as regions for displaying a logo, which enriches information content that can be directly obtained by the user. In addition, two logo regions are reserved to provide information about main brands and service types, functions or activities (such as red packets and meal ordering). The use of specific design shapes helps to cultivate code scanning habits of the user.

Figure 5:
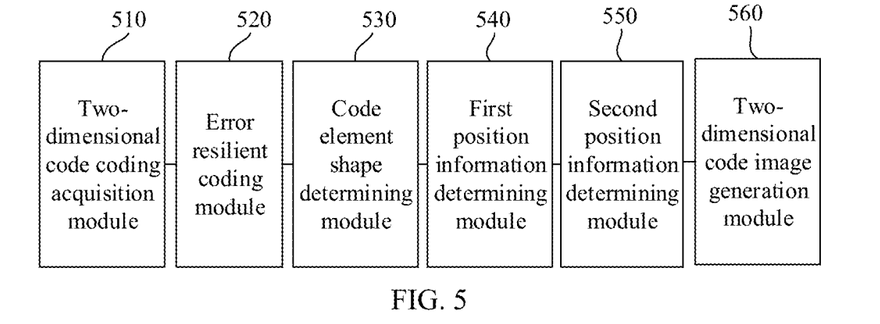
FIG. 5 is a schematic diagram illustrating a two-dimensional code generation apparatus, according to an embodiment of this specification.

Based on the same idea, an embodiment of this specification further provides an apparatus corresponding to the method in Embodiment 1. FIG. 5 is a schematic diagram illustrating a two-dimensional code generation apparatus, according to an embodiment of this specification. As shown in FIG. 5, the apparatus can include: a two-dimensional code acquisition module 510, configured to obtain two-dimensional code of a to-be-generated two-dimensional code image; an error resilient coding module 520, configured to perform error resilient coding on the two-dimensional code by using a coding algorithm with a predetermined error-tolerant rate, to obtain error-tolerant-processed two-dimensional code; a code element shape determining module 530, configured to determine a code element shape that is corresponding to each data information bit in the error-tolerant-processed two-dimensional code and that is in a generation region of the two-dimensional code image, where the code element shape includes a dot or an arc; a first position information determining module 540, configured to determine, according to a predetermined arrangement rule of the two-dimensional code, first position information that is corresponding to each data information bit of the error-tolerant-processed two-dimensional code and that is in the generation region; a second position information determining module 550, configured to determine second position information of each positioning point bit in the generation region; and a two-dimensional code image generation module 560, configured to generate the two-dimensional code image based on the first position information, the code element shape corresponding to each data information bit, and the second position information of each positioning point bit.

Based on the apparatus in FIG. 5, some embodiments of this specification further provide some specific implementations of the apparatus, which are described below.

Optionally, the code element shape determining module 530 can be specifically configured to: determine, for each code bit in the error-tolerant-processed two-dimensional code, a sequence of the code bit in the error-tolerant-processed two-dimensional code; determine a position of a data information bit corresponding to the sequence in the two-dimensional code generation region; and determine a code element shape corresponding to a data information bit of the position according to a value of the code bit.

Optionally, the apparatus can further include a mask module, configured to perform mask processing on the two-dimensional code according to the mask information, to obtain a mask-processed two-dimensional code.

Optionally, the positioning point bits can include first positioning point bits and second positioning point bits; the first positioning point bits can be separately distributed in an upper left corner position, an upper right corner position, and a lower left corner position of the generation region; and the second positioning point bits can be distributed in a lower right corner position of the generation region.

Optionally, the two-dimensional code image can include a ring formed by the dot and the arc; and a ring width of each circle of the ring is the same.

Optionally, the two-dimensional code image can further include an intermediate region, and the intermediate region can be concentric with the ring; the intermediate region is used to display a first identifier; adjacent rings have a same interval; and an interval between the intermediate region and a ring formed by adjacent code element shapes is the same as an interval between adjacent rings.

Optionally, a code element in the two-dimensional code image can be coded by using two colors.

Optionally, a region corresponding to a directional positioning point bit can be used to display a second identifier; and a display area of the second identifier is less than a display area of a first identifier.

Figure 6:
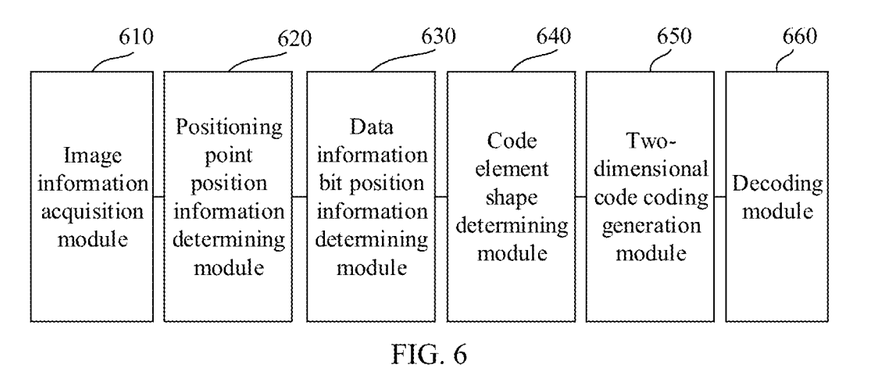
FIG. 6 is a schematic diagram illustrating a two-dimensional code decoding apparatus, according to an embodiment of this specification.

Based on the same idea, an embodiment of this specification further provides an apparatus corresponding to the method in Embodiment 2. FIG. 6 is a schematic diagram illustrating a two-dimensional code decoding apparatus, according to an embodiment of this specification. As shown in FIG. 6, the apparatus can include: an image information acquisition module 610, configured to obtain image information of a to-be-recognized two-dimensional code image; a positioning point position information determining module 620, configured to determine positioning point position information, in the image, of each positioning point bit in the to-be-recognized two-dimensional code image according to the image information of the to-be-recognized two-dimensional code image; a data information bit position information determining module 630, configured to determine position information of each data information bit in the image based on the positioning point position information; a code element shape determining module 640, configured to determine a code element shape corresponding to each data information bit based on the position information of the data information bit in the image, where the code element shape includes a dot or an arc; a two-dimensional code generation module 650, configured to: generate two-dimensional code according to a predetermined arrangement rule and the code element shape corresponding to each data information bit; and a decoding module 660, configured to decode the two-dimensional code by using a predetermined decoding algorithm, to obtain content information stored in the data information bit.

Based on the apparatus in FIG. 6, some embodiments of this specification further provide some specific implementations of the apparatus, which are described below.

Optionally, the to-be-recognized two-dimensional code image is in a ring shape; the image can include first positioning point bits and directional positioning point bits; the first positioning point bits are distributed in an upper left corner position, an upper right corner position, and a lower left corner position of the image; and the directional positioning point bits are distributed in a lower right corner of the image.

Optionally, the data information bit position information determining module 630 can specifically include: a data information bit position information determining unit, configured to determine position information, in the image, of each positioning point bit in the to-be-recognized two-dimensional code image and the position information of each data information in the image by using an adaptive sampling algorithm based on the positioning point position information.

Optionally, the data information bit position information determining unit can be specifically configured to: determine first position information, in an image coordinate system, of each positioning point bit in the to-be-recognized two-dimensional code image based on the positioning point position information; obtain second position information of each positioning point bit in a code-based coordinate system; calculate a transformation matrix between the code-based coordinate system and the image coordinate system based on the first position information and the second position information; obtaining third position information of each data information bit in the code-based coordinate system; determine an initial sampling point bit of each data information bit in the image coordinate system based on the transformation matrix and the third position information; modify the initial sampling point bit based on the adaptive sampling algorithm, to determine a final sampling point bit of each data information bit in the image coordinate system; and perform sampling on the to-be-recognized image based on the final sampling point bit to obtain the position information of each data information bit in the image.

Based on the same idea, some embodiments of this specification further provide a device that corresponds to the previous method.

Figure 7:
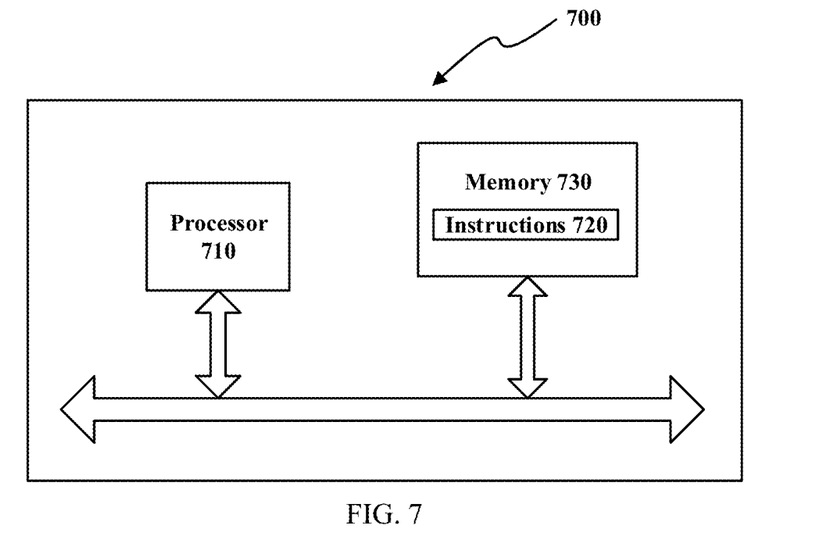
FIG. 7 is a schematic diagram of generating and decoding a two-dimensional code, according to an embodiment of this specification.

FIG. 7 is a schematic diagram of generating and decoding a two-dimensional code, according to an embodiment of this specification. As shown in FIG. 7, a device 700 can include at least one processor 710; and a memory 730 communicatively connected to the at least one processor, where the memory 730 stores instructions 720 that can be executed by the at least one processor 710.

Corresponding to Embodiment 1, the instructions are executed by the at least one processor 710, so the at least one processor 710 can: obtain two-dimensional code of a to-be-generated two-dimensional code image; perform error resilient coding on the two-dimensional code by using a coding algorithm with a predetermined error-tolerant rate, to obtain error-tolerant-processed two-dimensional code; determine a code element shape that is corresponding to each data information bit in the error-tolerant-processed two-dimensional code and that is in a generation region of the two-dimensional code image, where the code element shape includes a dot or an arc; determine, according to a predetermined arrangement rule of the two-dimensional code, first position information that is corresponding to each data information bit of the error-tolerant-processed two-dimensional code and that is in the generation region; determine second position information of each positioning point bit in the generation region; and generate the two-dimensional code image based on the first position information, the code element shape corresponding to each data information bit, and the second position information of each positioning point bit.

Corresponding to Embodiment 2, the instructions are executed by the at least one processor 710, so the at least one processor 710 can: obtain image information of a to-be-recognized two-dimensional code image; determine positioning point position information, in the image, of each positioning point bit in the to-be-recognized two-dimensional code image according to the image information of the to-be-recognized two-dimensional code image; determine position information of each data information bit in the image based on the positioning point position information; determine a code element shape corresponding to each data information bit based on the position information of the data information bit in the image, where the code element shape includes a dot or an arc; generate two-dimensional code according to a predetermined arrangement rule and the code element shape corresponding to each data information bit; and decode the two-dimensional code by using a predetermined decoding algorithm, to obtain content information stored in the data information bit.

Based on the same idea, some embodiments of this specification further provide a computer readable medium corresponding to the previous method. The computer readable medium stores computer readable instructions.

Corresponding to Embodiment 1, the computer readable instructions can be executed by a processor to implement the following method: obtaining two-dimensional code of a to-be-generated two-dimensional code image; performing error resilient coding on the two-dimensional code by using a coding algorithm with a predetermined error-tolerant rate, to obtain error-tolerant-processed two-dimensional code; determining a code element shape that is corresponding to each data information bit in the error-tolerant-processed two-dimensional code and that is in a generation region of the two-dimensional code image, where the code element shape includes a dot or an arc; determining, according to a predetermined arrangement rule of the two-dimensional code, first position information that is corresponding to each data information bit of the error-tolerant-processed two-dimensional code and that is in the generation region; determining second position information of each positioning point bit in the generation region; and generating the two-dimensional code image based on the first position information, the code element shape corresponding to each data information bit, and the second position information of each positioning point bit.

Corresponding to Embodiment 2, the computer readable instructions can be executed by a processor to implement the following method: obtaining image information of a to-be-recognized two-dimensional code image; determining positioning point position information, in the image, of each positioning point bit in the to-be-recognized two-dimensional code image according to the image information of the to-be-recognized two-dimensional code image; determining position information of each data information bit in the image based on the positioning point position information; determining a code element shape corresponding to each data information bit based on the position information of the data information bit in the image, where the code element shape includes a dot or an arc; generating two-dimensional code according to a predetermined arrangement rule and the code element shape corresponding to each data information bit; and decoding the two-dimensional code by using a predetermined decoding algorithm, to obtain content information stored in the data information bit.

The embodiments in this specification are described in a progressive way. For the same or similar parts of the embodiments, references can be made to the embodiments. Each embodiment focuses on a difference from other embodiments. Particularly, a device embodiment is similar to a method embodiment, and therefore is described briefly. For related parts, references can be made to related descriptions in the method embodiment.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For convenience of description, the above apparatuses are described separately in terms of their functions. Certainly, when this specification is implemented, a function of each unit can be implemented in one or more pieces of software and/or hardware.

A person skilled in the art should understand that an embodiment of the present specification can be provided as a method, a system, or a computer program product. Therefore, the present specification can use a form of hardware only embodiments, software only embodiments, or embodiments with a combination of software and hardware. Moreover, the embodiments of the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In typical configuration, the computing device includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: a phase change memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the definition in this specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an embodiment of this specification can be provided as a method, a system, or a computer program product. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification can be described in the general context of computer-executable instructions, for example, a program module. Generally, the program module includes a routine, a program, an object, a component, a data structure, etc. executing a specific task or implementing a specific abstract data type. This specification can alternatively be practiced in distributed computing environments in which tasks are performed by remote processing devices that are connected through a communications network. In a distributed computing environment, the program module can be located in both local and remote computer storage media including storage devices.

The previous embodiments are embodiments of this specification, and are not intended to limit this specification. A person skilled in the art can make various modifications and changes to this specification. Any modification, equivalent replacement, or improvement made without departing from the spirit and principle of this specification shall fall within the scope of the claims in this specification.

What is claimed is:

1. A two-dimensional code generation method, comprising:

obtaining two-dimensional code of a to-be-generated two-dimensional code image;

performing error resilient coding on the two-dimensional code by using a coding algorithm with a predetermined error-tolerant rate, to obtain error-tolerant-processed two-dimensional code;

determining a code element shape that is corresponding to each data information bit in the error-tolerant-processed two-dimensional code and that is in a generation region of the two-dimensional code image, wherein the code element shape comprises a dot or an arc;

determining, according to a predetermined arrangement rule of the two-dimensional code, first position information that is corresponding to each data information bit of the error-tolerant-processed two-dimensional code and that is in the generation region;

determining second position information of each positioning point bit in the generation region; and generating the two-dimensional code image based on the first position information, the code element shape corresponding to each data information bit, and the second position information of each positioning point bit, wherein the two-dimensional code image comprises a ring formed by the dot and the arc; and a ring width of each circle of the ring is the same.

2. The method according to claim 1, wherein the determining a code element shape that is corresponding to each data information bit in the error-tolerant-processed two-dimensional code and that is in a generation region of the two-dimensional code image specifically comprises:
   determining, for each code bit in the error-tolerant-processed two-dimensional code, a sequence of the code bit in the error-tolerant-processed two-dimensional code;
   determining a position of a data information bit corresponding to the sequence in the two-dimensional code generation region; and
   determining a code element shape corresponding to a data information bit of the position according to a value of the code bit.

3. The method according to claim 1, wherein the generation region further comprises mask information; and before the obtaining two-dimensional code of a to-be-generated two-dimensional code image, the method further comprises:
   performing mask processing on the two-dimensional code according to the mask information, to obtain a mask-processed two-dimensional code.

4. The method according to claim 1, wherein the positioning point bits comprise first positioning point bits and second positioning point bits; the first positioning point bits are separately distributed in an upper left corner position, an upper right corner position, and a lower left corner position of the generation region; and the second positioning point bits are distributed in a lower right corner position of the generation region.

5. The method according to claim 4, wherein a region corresponding to a directional positioning point bit is used to display a second identifier; and a display area of the second identifier is less than a display area of a first identifier.

6. The method according to claim 1, wherein the two-dimensional code image further comprises an intermediate region, and the intermediate region is concentric with the ring; the intermediate region is used to display a first identifier; adjacent rings have a same interval; and an interval between the intermediate region and a ring formed by adjacent code element shapes is the same as an interval between adjacent rings.

7. The method according to claim 1, wherein a code element in the two-dimensional code image is coded by using two colors.

8. A computing device, comprising
   a memory and a processor, wherein the memory stores executable instructions that, in response to execution by the processor, cause the computing device to:
   obtain two-dimensional code of a to-be-generated two-dimensional code image;
   perform error resilient coding on the two-dimensional code by using a coding algorithm with a predetermined error-tolerant rate, to obtain error-tolerant-processed two-dimensional code;
   determine a code element shape that is corresponding to each data information bit in the error-tolerant-processed two-dimensional code and that is in a generation region of the two-dimensional code image, wherein the code element shape comprises a dot or an arc;
   determine, according to a predetermined arrangement rule of the two-dimensional code, first position information that is corresponding to each data information bit of the error-tolerant-processed two-dimensional code and that is in the generation region;
   determine second position information of each positioning point bit in the generation region; and
   generate the two-dimensional code image based on the first position information, the code element shape corresponding to each data information bit, and the second position information of each positioning point bit,
   wherein the two-dimensional code image comprises a ring formed by the dot and the arc; and
   a ring width of each circle of the ring is the same.

9. The computing device according to claim 8, wherein being caused to determine the code element shape that is corresponding to each data information bit in the error-tolerant-processed two-dimensional code and that is in the generation region of the two-dimensional code image comprises being caused to:
   determine, for each code bit in the error-tolerant-processed two-dimensional code, a sequence of the code bit in the error-tolerant-processed two-dimensional code;
   determine a position of a data information bit corresponding to the sequence in the two-dimensional code generation region; and
   determine a code element shape corresponding to a data information bit of the position according to a value of the code bit.

10. The computing device according to claim 8, wherein the generation region further comprises mask information; and wherein the computing device is further caused to, before the obtaining two-dimensional code of a to-be-generated two-dimensional code image:
    perform mask processing on the two-dimensional code according to the mask information, to obtain a mask-processed two-dimensional code.

11. The computing device according to claim 8, wherein the positioning point bits comprise first positioning point bits and second positioning point bits; the first positioning point bits are separately distributed in an upper left corner position, an upper right corner position, and a lower left corner position of the generation region; and the second positioning point bits are distributed in a lower right corner position of the generation region.

12. The computing device according to claim 11, wherein a region corresponding to a directional positioning point bit is used to display a second identifier; and a display area of the second identifier is less than a display area of a first identifier.

13. The computing device according to claim 8, wherein the two-dimensional code image further comprises an intermediate region, and the intermediate region is concentric with the ring; the intermediate region is used to display a first identifier; adjacent rings have a same interval; and an interval between the intermediate region and a ring formed by adjacent code element shapes is the same as an interval between adjacent rings.

14. The computing device according to claim 8, wherein a code element in the two-dimensional code image is coded by using two colors.

15. A non-transitory computer readable storage medium having stored therein instructions that, when executed by a processor of a device, cause the device to:
    obtain two-dimensional code of a to-be-generated two-dimensional code image;
    perform error resilient coding on the two-dimensional code by using a coding algorithm with a predetermined error-tolerant rate, to obtain error-tolerant-processed two-dimensional code;
    determine a code element shape that is corresponding to each data information bit in the error-tolerant-processed two-dimensional code and that is in a generation region of the two-dimensional code image, wherein the code element shape comprises a dot or an arc;

determine, according to a predetermined arrangement rule of the two-dimensional code, first position information that is corresponding to each data information bit of the error-tolerant-processed two-dimensional code and that is in the generation region;

determine second position information of each positioning point bit in the generation region; and generate the two-dimensional code image based on the first position information, the code element shape corresponding to each data information bit, and the second position information of each positioning point bit, wherein the two-dimensional code image comprises a ring formed by the dot and the arc; and a ring width of each circle of the ring is the same.

16. The non-transitory computer readable storage medium according to claim 15, wherein being caused to determine the code element shape that is corresponding to each data information bit in the error-tolerant-processed two-dimensional code and that is in the generation region of the two-dimensional code image comprises being caused to:

determine, for each code bit in the error-tolerant-processed two-dimensional code, a sequence of the code bit in the error-tolerant-processed two-dimensional code;

determine a position of a data information bit corresponding to the sequence in the two-dimensional code generation region; and determine a code element shape corresponding to a data information bit of the position according to a value of the code bit.

17. The non-transitory computer readable storage medium according to claim 15, wherein the generation region further comprises mask information; and wherein the device is further caused to, before the obtaining two-dimensional code of a to-be-generated two-dimensional code image:

perform mask processing on the two-dimensional code according to the mask information, to obtain a mask-processed two-dimensional code.

18. The non-transitory computer readable storage medium according to claim 15, wherein the positioning point bits comprise first positioning point bits and second positioning point bits; the first positioning point bits are separately distributed in an upper left corner position, an upper right corner position, and a lower left corner position of the generation region; and the second positioning point bits are distributed in a lower right corner position of the generation region.

19. The non-transitory computer readable storage medium according to claim 15, wherein the two-dimensional code image further comprises an intermediate region, and the intermediate region is concentric with the ring; the intermediate region is used to display a first identifier; adjacent rings have a same interval; and an interval between the intermediate region and a ring formed by adjacent code element shapes is the same as an interval between adjacent rings.

20. The non-transitory computer readable storage medium according to claim 15, wherein a code element in the two-dimensional code image is coded by using two colors.

* * * * *